Aug. 14, 1934.  J. M. WEST  1,970,350
TRANSMISSION LINE
Filed May 20, 1931   2 Sheets-Sheet 1
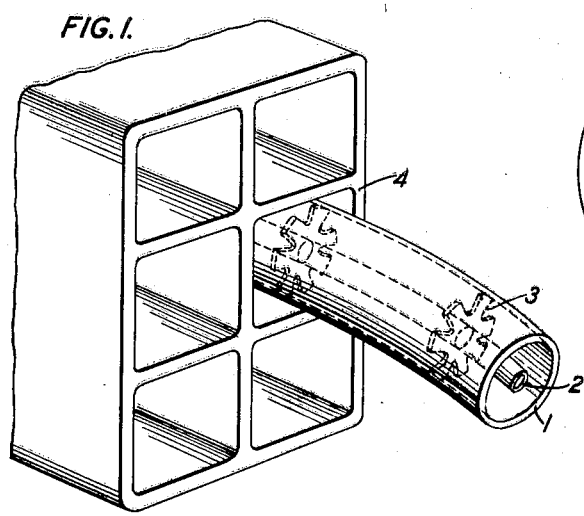
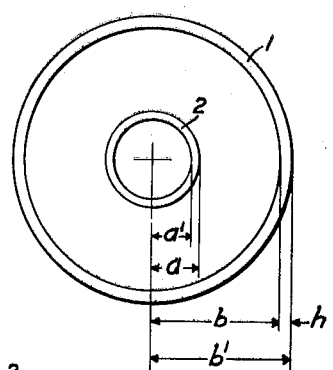
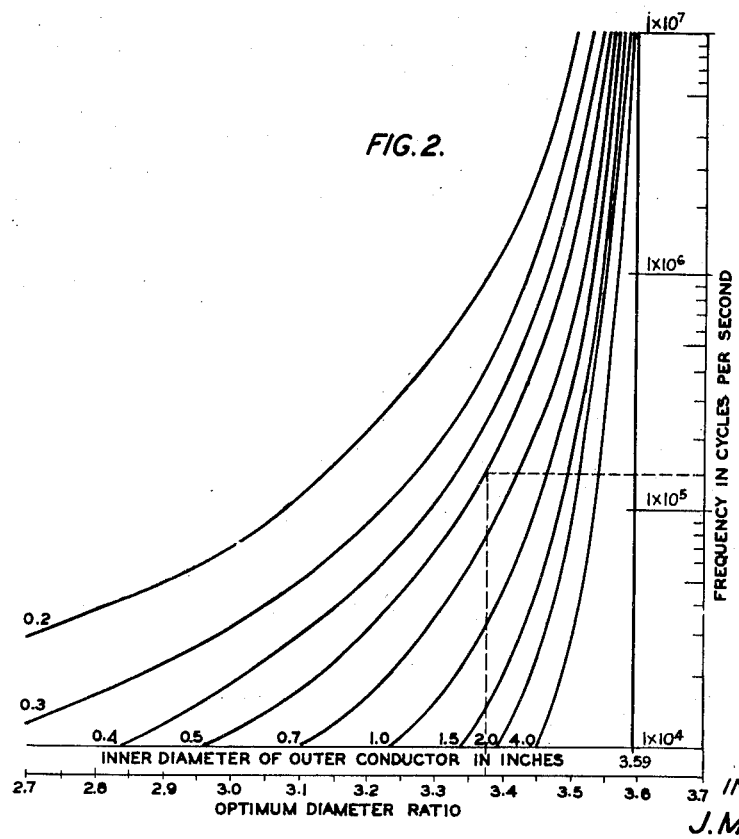
INVENTOR
J. M. WEST
BY
ATTORNEY Aug. 14, 1934.  J. M. WEST  1,970,350
TRANSMISSION LINE
Filed May 20, 1931   2 Sheets-Sheet 2
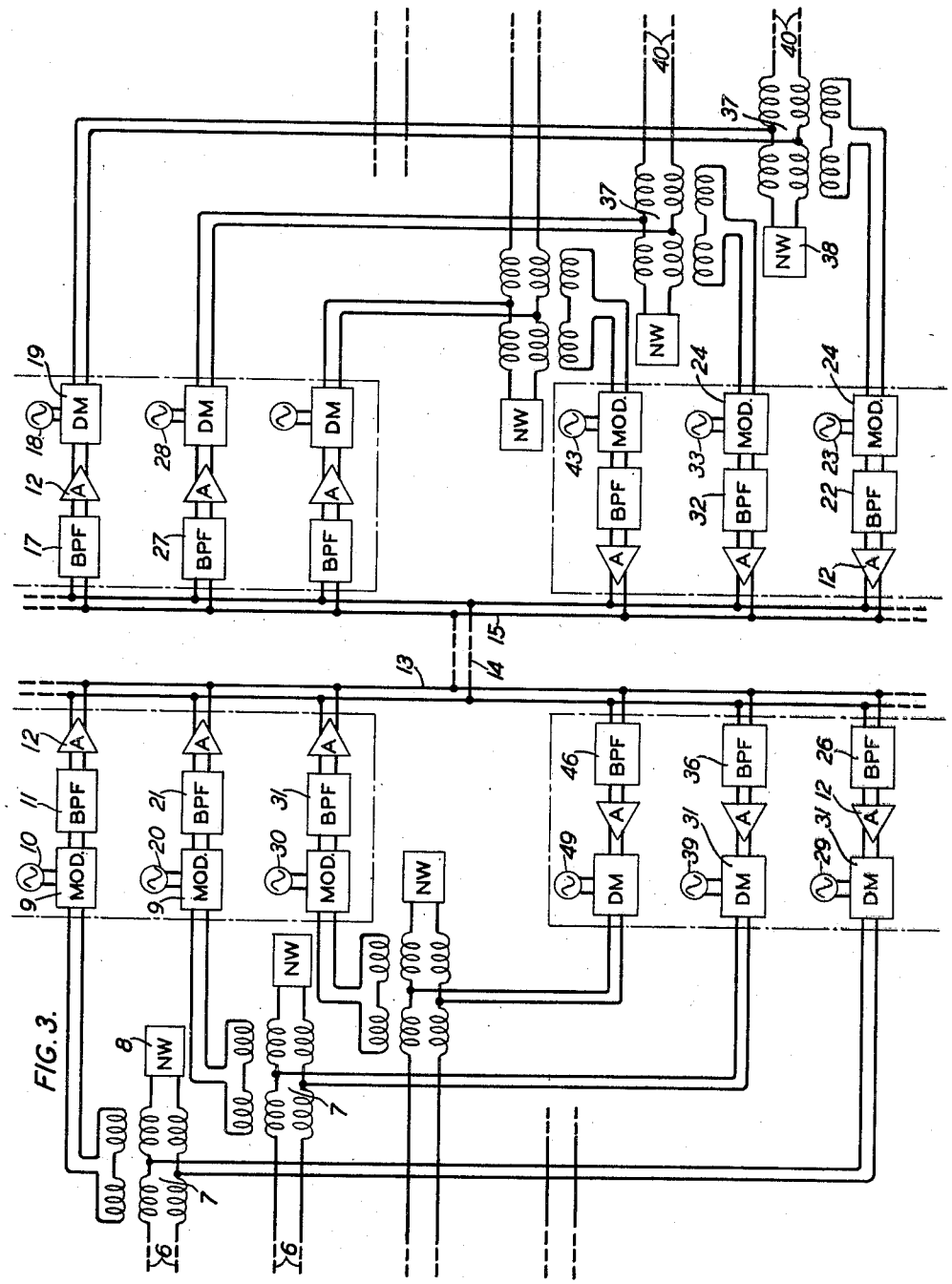

Patented Aug. 14, 1934

1,970,350

UNITED STATES PATENT OFFICE 1,970,350

TRANSMISSION LINE

Julian M. West, Nutley, N. J., assignor to Bell Telephone Laboratories, Incorporated, New York, N. Y., a corporation of New York Application May 20, 1931, Serial No. 538,647

8 Claims. (Cl. 178—44)

The present invention relates to a system for the transmission of guided electrical signaling waves, and more particularly to a concentric conductor line for use in a system adapted to transmit signals extending over a wide range of frequencies.

It is an object of the invention to obtain the maximum efficiency of transmission of which a concentric conductor line of fixed outer diameter is capable.

In another aspect of the invention, it is an object to obtain an optimum proportioning of the conductors in a concentric conductor transmission line with respect to its attenuation and to the amount of material comprising it.

In the development of the art of electrical communication it has been increasingly desirable to extend the range of frequencies transmitted over conducting lines. Lines of the open wire type have heretofore been the best available for the transmission of high frequency waves, such as used in carrier telephony. The frequent transpositions of conductors made necessary by the coupling between parallel circuits and the susceptibility of open wire lines to interference from external sources seriously limit the frequency range and field of usefulness of this type of line. Cable circuits are not well suited for use at very high frequencies because of the high capacity between conductors.

The transmission element to which the present invention relates comprises a central conductor, either solid or tubular, and an outer tubular conductor concentric therewith and insulated therefrom. The dielectric between conductors is preferably gaseous, only a sufficient number of insulating spacers or washers being provided to maintain the conductors in their concentric relation. A compound conductor of this type has several characteristics which well adapt it to the transmission of waves of high frequency. For example, the grounded outer conductor acts as a shield for the inner and practically eliminates interference from stray electric and magnetic fields. Induction from adjacent signal conductors, for the same reason, is at an extremely low level. Conversely, signals in the concentric conductors create but little interference in adjacent channels, as the fields associated with the signal waves are closely confined to the annular space between central and outer conductors. Further, the efficiency of the line is practically independent of weather conditions, as the gaseous dielectric is entirely enclosed and can be maintained at constant pressure and humidity. A concentric pair of conductors having an outer diameter of a few inches will transmit over long distance frequencies that can be measured in megacycles, and with only moderate attenuation.

At high frequencies the current in a concentric pair of conductors is not uniformly distributed throughout the conducting material, but tends to concentrate at the outer surface of the central conductor and at the inner surface of the surrounding conductor. The unused portion of the material cannot be dispensed with, however, as mechanical considerations require that the conductors be made of substantial thickness. It will be readily appreciated that even a relatively slight reduction in either attenuation or diameter of conductors will, in the aggregate, represent a considerable economy or an improvement in efficiency.

Applicant has discovered that for a pair of coaxial conductors of fixed outer diameter there exists a ratio between the inner diameter of the outer conductor and the outer diameter of the inner conductor, which, if observed, will result in a minimum transmission loss in waves of a given frequency, other things being equal. This optimum ratio, in general, depends on both the diameter of the outer conductor and the frequency for which the conductor is designed. At very high frequencies, however, minimum attenuation obtains for practically all diameters of outer conductors when the ratio of diameters is somewhat less than 3.6; similarly, if the absolute diameters of the conductors are large, 3.6 is approximately the optimum figure at all frequencies. In a copending application of E. I. Green and F. A. Leibe bearing Serial No. 365,517, filed May 23, 1929, it is shown that in the ranges of frequencies and diameters in which their formulæ are applicable, the optimum ratio of diameters is 3.59, independent of frequency and absolute diameters. This ratio, 3.59, applicant finds, however, is an upper asymptotic limit which the optimum ratios approach as the absolute diameters of the conductors or the frequency, or both, approach the values at which the equations of the Green et al application supra apply. For lower values of frequency and outer diameter the expression for the optimum ratio is a complex function involving both factors. This expression will be developed hereinafter and an explanation made of its application in any particular instance.

Applicant has discovered another characteristic of a concentric conductor system, which taken together with the discovery of an optimum diameter ratio, makes possible what is in some cases an even more effective disposition of the material comprising the conductors. This discovery is that with a fixed outer diameter the ratio of diameters may depart considerably from that at which an absolute minimum of attenuation occurs without occasioning more than a slight change in the attenuation of the system. To provide a conductor between two points, then, which is to have a predetermined attenuation, a greater diameter ratio than the optimum, and therefore, a smaller inner conductor, may be used, with a resulting substantial economy of copper or other material that may comprise the conductor.

The nature of the present invention will more fully appear from a consideration of the following detailed description and accompanying drawings, of which:

Fig. 1 shows the construction and application of one type of concentric conductor cable;

Fig. 2 shows graphically the relation between optimum diameter ratio, frequency and diameter of outer conductor;

Fig. 3 shows a system embodying the present invention; and

Fig. 4 shows diagrammatically a cross-section of a concentric conductor cable.

The bearing of diameter ratio on the attenuation of a concentric conductor cable can be seen by considering its relation to the several factors determining the attenuation constant ($\alpha$), viz., the alternating-current resistance (R) of the conductors, the capacity (C) between conductors, the shunting conductance (G) and the inductance (L). These factors are related by the equation:

$$\alpha = \frac{R}{2}\sqrt{\frac{C}{L}} + \frac{G}{2}\sqrt{\frac{L}{C}} \tag{1}$$

Because of the good insulation between conductors of the concentric type, the conductance (G) is very small; the quantity containing it may usually, therefore, be disregarded. With a given diameter of outer conductor Equation (1) indicates that by increasing the diameter of the central conductor, and thereby decreasing the resistance, the attenuation constant tends to be reduced. Increasing the diameter of the central conductor at the same time increases the capacity (C) between conductors; the inductance (L) is decreased. Both these latter changes tend to increase the attenuation. At some point the reduction of resistance (R) attending an increase in the diameter of the inner conductor is offset by an equal or greater increase in the factor $$\sqrt{\frac{C}{L}}.$$

The ratio of diameters at this point is then at an optimum, a change in either direction occasioning an increase in attenuation.

At very high frequencies, as pointed out hereinbefore, the current is concentrated at the outer surface of the central conductor and at the inner surface of the outer conductor. It is the ratio of the diameters of these cylindrical surfaces that is of significance rather than the ratio of the outer diameters of the conductors. In the application of E. I. Green et al supra it is stated that $$R = K_0\sqrt{f}\left(\frac{1}{a}+\frac{1}{b}\right) \tag{2}$$

$$L = K_1 \log_e \frac{b}{a} \tag{3}$$

$$C = K_2 \frac{1}{\log_e \frac{b}{a}} \tag{4}$$

where R, L and C have the same significance as in Equation (1); $f$ is the frequency, $a$ is the outer radius of the central conductor, $b$ is the inner radius of the outer conductor, and $K_0$, $K_1$ and $K_2$ are numerical constants. With these expressions inserted in Equation (1), the attenuation constant $\alpha$ is shown to be a minimum when the ratio of $b$ to $a$ is 3.59. Within the limits of frequency and diameter fixed by the approximations involved in Equations (2), (3) and (4), the optimum ratio is independent of frequency and diameter.

At lower frequencies skin effect is not as pronounced and it cannot be assumed that the current is confined to the surface layers. An equation for the attenuation constant $\alpha$ of more general applicability must therefore be used.

The following is one of several equations accurately expressing the propagation characteristic $\Gamma$ of a concentric conductor pair:

$$\Gamma = \alpha + j\beta = \frac{j\omega}{c}\left[1 + \frac{1}{p \log k}\frac{\text{ber } p + j \text{ bei } p}{\text{ber}' p + j \text{ bei}' p} + \frac{A-jB}{Dq \log k} + \frac{j}{q^2 \log k}\right]^{1/2} \tag{5}$$

where $\alpha$ = attenuation in nepers per cm.
$\beta$ = phase shift in radians per cm.
$\omega = 2\pi f$
$c = 3 \times 10^{10}$
$k = b/a$
$b$ = inner radius of outer conductor in cms.
$a$ = outer radius of inner conductor in cms.
$h$ = thickness of outer conductor in cms.
$p = 2\pi\sqrt{2\lambda f} \times a$
$q = 4\pi\sqrt{\lambda f} \times b$
$\lambda$ = conductivity in abohms per cm.
$S = 4\pi\sqrt{\lambda f} \times h$
$A = \sinh S - \sin S$
$B = \sinh S + \sin S$
$D = \cosh S - \cos S$ and ber $p$ and bei $p$ are Bessel's functions which can be evaluated by reference to mathematical tables. The attenuation constant is the real part of the complex quantity on the right hand side. It can be expressed in slightly different form when some assumptions are made as to the thickness of the conductors. Where the quantity $$4\pi\sqrt{\lambda f} \times h$$

is equal to or greater than $2\pi$, the conductor may be said to be electrically thick. Provided that the outer conductor is electrically thick and the inner conductor either electrically thick or solid, the attenuation constant is given by the expression:

$$\alpha = \text{real part of } jf \times \left[1 + \frac{1}{p \log k}\frac{\text{ber } p + j \text{ bei } p}{\text{ber}' p + j \text{ bei}' p} + \frac{1-j}{\sqrt{2}pk \log k} + \frac{j}{2p^2k^2 \log k}\right]^{1/2} \times 2.928 \times 10^{-4}, \tag{6}$$

where $\alpha$ is in decibels per mile.

The following is a brief outline of the proof of Equation (5). In a transmission line formed of two coaxial cylindrical conductors, the distribution of the electric force in any plane at right angles to the axis, is symmetrical with respect to the common axis of the two conductors and is, therefore, a function of one variable only, namely of the distance from the axis. In what follows it is supposed that a sinusoidal electromotive force is impressed upon the transmission line. Conforming to the usual custom this force may be expressed in a complex form $Ee^{j\omega t - \Gamma z}$. It is well known that in a region occupied by a conductor the quantity $E$ satisfies the following differential equation $$\frac{d^2E}{dr^2} + \frac{1}{r}\frac{dE}{dr} - \sigma^2 E = 0 \qquad (7)$$

where $$\sigma = \sqrt{4\pi\lambda\omega\mu j} = 2\pi\sqrt{\lambda\mu f}(1+j).$$

This is Bessel's equation and its most general solution can be expressed in terms of Bessel's functions. It is also well known that the tangential components of the electric and magnetic forces are continuous across the boundary between two different media; similarly the normal components of the electric and magnetic induction are also continuous.

Inside the inner conductor the particular solution of Equation (7) subject to the above mentioned boundary conditions is given by the following equation $$E_1(\sigma r) = IZ_1(\sigma r) \qquad (8)$$

where $$Z_1(\sigma r) = \frac{2j\omega\mu}{\sigma a}\frac{I_0(\sigma r)}{I'_0(\sigma a)} \qquad (9)$$

and $I$ is the total current flowing in the inner conductor. Similarly for the outer conductor we have $$E_2(\sigma r) = -IZ_2(\sigma b, \sigma r; \sigma b_2), \qquad (10)$$

where $a'$ is the inner radius of the inner conductor, and where $$Z_2(\sigma b, \sigma r; \sigma a') = \frac{2j\omega\mu}{\sigma b}\begin{vmatrix} I_0(\sigma r)I'_0(\sigma a') \\ K_0(\sigma r)K'_0(\sigma a') \\ I'_0(\sigma a)I'_0(\sigma b) \\ K'_0(\sigma a)K'_0(\sigma b) \end{vmatrix} \qquad (11)$$

It can be also shown that to a very high degree of accuracy the electric force in a dielectric between the conductors satisfies the following differential equation $$\frac{dE}{dr} = \left(j\omega\mu - \frac{\Gamma^2}{4\pi g + j\omega\epsilon}\right)\frac{2I}{r} \qquad (12)$$

where $g$ and $\epsilon$ are respectively the conductivity and the dielectric constant of the medium between the conductors. The solution of Equation (12) can be written as $$E = 2\left(j\omega\mu - \frac{\Gamma^2}{4\pi g + j\omega\epsilon}\right)I\log\frac{r}{A} \qquad (13)$$

where $A$ is an unknown constant to be determined from the boundary conditions. The latter require that the value of $E$ if computed by Equation (13) when $r=a$ should equal the corresponding value of the electric force if computed by Equation (8). Similarly the value of $E$ computed from Equation (13) for $r=b$ should be the same as the corresponding value of $E$ when computed from Equation (10). These two conditions make possible the determination of $A$; moreover, they impose a restriction upon $\Gamma$. In fact these conditions assign the following value for the propagation constant $$\Gamma = \sqrt{[j\omega L + Z_1(\sigma a) + Z_2(\sigma b, \sigma b; \sigma a')][G + j\omega C]} \qquad (14)$$

where $$L = 2\mu\log\frac{b}{a}, C = \frac{\epsilon}{2\log\frac{b}{a}}, G = \frac{2\pi g}{\log\frac{b}{a}}. \qquad (15)$$

Expressing Bessel functions involved in $Z_1(\sigma a)$ in terms of ber and bei functions and replacing the Bessel functions occurring in $Z_2(\sigma b, \sigma b; \sigma a')$ by the first two terms of the corresponding asymptotic expansions, I obtain Equation (5).

The validity of Equations (5) and (6) is dependent not on the frequency alone, but on a function of frequency and absolute diameter. They are accurate to a fraction of one per cent when $q$, i. e., $$4\pi\sqrt{\lambda f}\times b$$

is equal to or is greater than 7. A solution for the value of $k$, the ratio of diameter at which the attenuation is a minimum, can be obtained mathematically or graphically. It will be found by either method that the optimum ratio is a function of both the diameter of the outer conductor and the frequency selected.

Fig. 2 shows graphically the variation of the optimum diameter ratio with both frequency and absolute inner diameter of outer conductor. Frequency is scaled logarithmically along the axis of ordinates, diameter ratios are indicated by the abscissæ. What curve of the family shown is to be used in designing a given concentric conductor pair is determined by the inner diameter of the outer conductor. Noting the intersection of this curve with the horizontal line corresponding to the frequency selected and observing the abscissæ of this point the optimum ratio is obtained directly. Since the attenuation increases with frequency it is ordinarily the highest frequency in the band of frequencies to be transmitted that is used in determining the diameter ratio. As a numerical example, suppose the highest frequency of signals to be transmitted over a conductor is one hundred fifty thousand cycles per second and that the conductor, perhaps one of several within a protecting sheath, is such that the inner diameter of the outer conductor is one-half inch. Selecting the corresponding curve in Fig. 2 and tracing the horizontal line representing one hundred fifty thousand cycles per second to its intersection therewith, the optimum diameter ratio is shown on the scale of the abscissæ to be 3.37. The outer diameter of the inner conductor should therefore be approximately fifteen-hundredths of an inch. As the frequency is increased and larger diameters are used for the outer conductor the optimum ratio likewise increases, with 3.59 as the asymptotic limit. The discovery of this limit of optimum values is due to E. I. Green and F. A. Leibe and is disclosed and claimed in their application for patent identified above. That discovery is not within the scope of the present invention, which is directed to concentric conductors having diameter ratios less than the limiting value of 3.59. The optimum will be approximately 3.55, or less, for concentric conductor cables having frequencies and inner radii of outer conductors related by the empirical expression $$b^2 f \leq 10 \times 10^5,$$

wherein $b$ is in inches and $f$ is in cycles per second.

In Fig. 1 is shown a pair of concentric conductors 1, 2, the outer diameter of which is limited by the size of the channels in conduit 4. The outer conductor 1 may be a hollow cylinder of copper or other suitable conducting material or a thin layer of copper on a pipe of some cheaper material such as lead. The inner conductor 2 may be solid or tubular. It is supported in concentric relation with the outer conductor by insulating spacers 3 which are placed at frequent intervals. The spacers, or washers, are made as thin as mechanical requirements will permit and are comprised of pyrex glass or other good insulating material having a low dielectric constant and small loss angle.

Fig. 3 shows a carrier-frequency signal transmission system in which the present invention may be embodied. Two-way transmission is obtained over the concentric conductor transmission line 14 by using separate frequency ranges for the signals transmitted in the two directions. Signals from the telephone subscribers' lines 6 are transmitted through hybrid coils 7 to the individual modulators 9. The carrier waves supplied to the modulators by oscillators 10, 20, 30, etc., may range, for example, from twenty to eighty thousand cycles per second, the frequency of each oscillator differing from that of the next by at least the width of the band of signal frequencies. After passing through the respective band-pass filters 11, 21, 31, etc., and amplifiers 12 the modulated carrier waves are applied to transmission line 14. The latter may be of the concentric conductor type described hereinbefore.

The apparatus for transmitting in the opposite direction may be identical with that just described except that the carrier frequencies employed may range from perhaps ninety to one hundred and fifty thousand cycles per second. With these frequency ranges, fifteen channels may be provided for each direction of transmission.

Signals received from line 14 are selected by the band-pass filters 26, 36, 46, etc., passed through amplifiers 12 and reduced to their original form in demodulators 31. The frequencies of the oscillators 29, 39, 49, etc., correspond with those of the carrier waves on which the signals are impressed. The signals are then applied to the input terminals of hybrid coils 7 and transmitted over the subscribers' lines 6. A system of this type is described in L. Espenschied Patent 1,548,260, August 4, 1925, to which reference may be made for further details of the construction of the apparatus and of the operation of the circuits employed.

Applicant has discovered another characteristic of coaxial conductor lines that can be used to good advantage in proportioning the conductors. It is found that within wide limits about the optimum diameter ratio, there is little change in attenuation with change in the diameter of the central conductor. An explanation of this gradual change in attenuation would involve the fact that when either increasing or decreasing this inner diameter the two factors determining $\alpha$, as shown in Equation (1), change in opposite senses. This small variation in attenuation permits the central conductor to be made smaller than dictated by the optimum ratio without substantial loss in transmission efficiency. A considerable saving in conductor material can be effected by this procedure. To what extent the inner diameter may economically be reduced will depend in part on the diameter of the outer conductor and on the frequency, and on the desirability of absolutely minimum attenuation. Within the range of frequencies and diameters illustrated in Fig. 2, a ten per cent change in diameter ratio occasions less than one per cent change in attenuation. Where the diameter of the outer conductor is not limited, a diameter ratio of 4.68 will result in an optimum disposition of a fixed amount of conducting material, as disclosed and claimed in U. S. Patent 1,885,195, which issued to E. I. Green on November 1, 1932. Likewise, if for any reason it is desired to use a central conductor of greater than optimum diameter, such may be done with little increase in attenuation. For example, where the overall diameter of the conductor pair is a small fraction of an inch, mechanical considerations might make it desirable to increase the diameter of the central conductor. However, where absolutely minimum attenuation is desired the outer diameter of the inner conductor should bear the relation to the inner diameter of the outer conductor given by the equations and drawings disclosed herein.

While specific examples of concentric conductors and of a signalling system embodying the present invention have been described, it is obvious that the invention is not limited thereto but may find embodiment in other and widely different forms within the scope and spirit of the appended claims.

What is claimed is:

1. In a high frequency signaling system, a transmission line comprising a central conductor and an outer cylindrical return conductor concentric therewith and separated therefrom by a suitable dielectric, the ratio of the outer diameter of said central conductor to the inner diameter of said outer conductor being such that the attenuation of the waves of highest frequency transmitted over said line is a minimum, the inner diameter of said outer conductor and the maximum frequency transmitted over said line being so related that said optimum ratio is less than 3.59.

2. In a high frequency signaling system, a transmission line comprising a central conductor and an outer cylindrical return conductor concentric therewith, means to apply a wide band of signaling frequencies to said line, the product of the maximum signaling frequency transmitted over said line and the square of the inner diameter of said outer conductor in inches being less than $10^6$, and the ratio of the inner diameter of said outer conductor to the outer diameter of said central conductor being such that the attenuation of waves of said maximum frequency is a minimum.

3. In a high frequency signaling system, a transmission line comprising a central conductor and an outer cylindrical return conductor concentric therewith and separated therefrom by a dielectric which is chiefly gaseous, the ratio of the inner diameter of said outer conductor to the outer diameter of said central conductor being not more than ten per cent greater than the ratio for which the attenuation of waves of said maximum frequency in a line having the same inner diameter of outer conductor would be a minimum, said latter ratio being less than 3.5.

4. In a high frequency signaling system, a transmission line comprising a central conductor and an outer cylindrical return conductor concentric therewith and separated therefrom by a dielectric which is chiefly gaseous, means to apply to said line signaling waves extending in frequency to a maximum of at least several hundred thousand cycles per second, the inner radius $b$ of said outer conductor being less than 3.59 times the outer radius $a$ of said central conductor and both being so related to the maximum signaling frequency $f$ to be transmitted over said line that the real part of the following expression is a minimum:

$$jf\left[1+\frac{1}{p\log k}\frac{\text{ber }p+j\text{ bei }p}{\text{ber}'\,p+j\text{ bei}'p}+\frac{1-j}{2pk\log_e k}+\frac{j}{2p^2k^2\log k}\right]^{1/2}$$

wherein $$p = 2\pi\sqrt{2\lambda f}\times a$$

$\lambda$ = conductivity of material in abohms per cm.

$$k=\frac{b}{a}$$

5. A signaling system comprising in combination means to produce signal waves extending over a wide band of frequencies, and a transmission line associated therewith comprising a central conductor and an outer cylindrical return conductor concentric therewith and separated therefrom by a dielectric which is chiefly gaseous, the ratio of the outer diameter of said central conductor to the inner diameter of said outer conductor being substantially less than 3.59 and so related to said diameter of said outer conductor and to the highest signaling frequency transmitted over said line that the attenuation of the waves of said highest frequency is a minimum.

6. A signaling system in accordance with claim 5 in which the product of the maximum signaling frequency transmitted over said line and the square of the inner diameter of said outer conductor in inches is less than $10^6$.

7. In a system adapted to transmit signaling waves of carrier frequencies, a transmission line associated therewith comprising a central conductor and an outer cylindrical conductor concentric therewith and separated therefrom by a dielectric which is chiefly gaseous, the ratio of the inner diameter of said outer conductor to the outer diameter of said central conductor differing by not more than ten per cent from the ratio at which, the inner diameter of said outer conductor being the same, the attenuation of the waves of highest frequency transmitted would be a minimum, said outer conductor being a fraction of an inch in diameter and said highest frequency being so related to the inner diameter of said outer conductor that said last-mentioned ratio is not greater than 3.5.

8. In a signaling system adapted to transmit a maximum frequency of the order of hundreds of kilocycles per second, a transmission line comprising a central conductor and a hollow return conductor concentric therewith, said return conductor being a fraction of an inch in diameter, and the ratio of the inner diameter of said return conductor to the outer diameter of said central conductor being such that the attenuation of waves of said maximum frequency is a minimum.

JULIAN M. WEST.